(12) United States Patent
Jackson

(10) Patent No.: US 8,231,280 B2
(45) Date of Patent: Jul. 31, 2012

(54) SCULPTURED BEARING LINER AND BEARING ASSEMBLY

(75) Inventor: K. Myron Jackson, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 540 days.

(21) Appl. No.: 12/518,718

(22) PCT Filed: Dec. 22, 2006

(86) PCT No.: PCT/US2006/049236
§ 371 (c)(1),
(2), (4) Date: Jun. 11, 2009

(87) PCT Pub. No.: WO2008/079125
PCT Pub. Date: Jul. 3, 2008

(65) Prior Publication Data
US 2010/0034490 A1  Feb. 11, 2010

(51) Int. Cl.
F16C 33/04 (2006.01)
(52) U.S. Cl. ....................................................... 384/535
(58) Field of Classification Search .................. 384/535, 384/422, 416, 301, 276, 275, 26; 280/511; 403/371, 372, 365, 135, 39
See application file for complete search history.

(56) References Cited

U.S. PATENT DOCUMENTS
4,772,139 A   9/1988  Bretton
2006/0013518 A1  1/2006  Foster et al.

FOREIGN PATENT DOCUMENTS
DE   3728039 A1   3/1989
DE   202004015680 U1   4/2006

OTHER PUBLICATIONS

Chinese Office Action from Chinese counterpart Application No. 200680056764.6, issued by the Patent Office of China on Jan. 19, 2011.
Canadian Office Action from counterpart CA Application No. 2,672,610, issued by the Canadian Intellectual Patent Office on Jul. 15, 2011.
Supplementary European Search Report from counterpart EP Application No. 06850014, issued by the European Patent Office on Jun. 29, 2011.
International Preliminary Report on Patentability dated Mar. 26, 2009 from PCT/US06/49236.
International Search Report and Written Opinion of the International Searching Authority dated Oct. 26, 2007 from PCT/US06/49236.
Chinese Examination Report from counterpart CN Application No. 200680056764.6, issued by the Chinese Patent Office on Dec. 23, 2011.

*Primary Examiner* — Thomas R Hannon
(74) *Attorney, Agent, or Firm* — James E. Walton; Richard G. Eldredge

(57) ABSTRACT

A sculptured bearing liner includes an inner surface defining a cavity configured to receive a bearing, an outer surface and a reduced thickness portion extending from one of the inner surface and the outer surface. A bearing assembly includes a bearing liner having an inner surface, an outer surface, and a reduced thickness portion extending between the inner surface and the outer surface, the inner surface defining a cavity. The bearing assembly further includes at least one bearing disposed in the cavity.

18 Claims, 2 Drawing Sheets

SCULPTURED BEARING LINER AND BEARING ASSEMBLY

TECHNICAL FIELD

The present invention relates in general to the field of bearings.

DESCRIPTION OF THE PRIOR ART

Many machines incorporate rotating parts, such as shafts, gears, and the like. Most of these machines utilize bearings to support rotating members with respect to fixed members. The fixed members are, at times, made of softer materials, while the bearings comprise harder materials. If the bearings are retained directly against the softer, fixed member, the fixed member will likely be damaged when the bearing is replaced. Thus, it is often desirable to mount such bearings in bearing liners, which are then press-fit or otherwise retained in the fixed members. Moreover, fretting is less likely to occur between the bearing liner and the fixed member than if the bearing liner is omitted.

Many such machines are weight sensitive. In other words, it is important to design the machines so that their weight is kept to a minimum. Weight sensitivity is particularly important in aircraft. Helicopters, as well as other types of aircraft, utilize many bearings. For example, a typical helicopter gearbox contains six or more such bearings, which are typically mounted in bearing liners. Conventional bearing liners, however, have substantially consistent thicknesses.

There are many bearings and bearing liners well known in the art; however, considerable room for improvement remains.

SUMMARY OF THE INVENTION

There is a need for an improved bearing liner and bearing assembly.

Therefore, it is an object of the present invention to provide an improved bearing liner and bearing assembly.

This and other objects are achieved by providing a sculptured bearing liner. The sculptured bearing liner includes an inner surface defining a cavity configured to receive a bearing, an outer surface and a reduced thickness portion extending from one of the inner surface and the outer surface.

In another aspect of the present invention, a bearing assembly is provided. The bearing assembly includes a bearing liner having an inner surface, an outer surface, and a reduced thickness portion extending between the inner surface and the outer surface, the inner surface defining a cavity. The bearing assembly further includes at least one bearing disposed in the cavity.

The present invention provides significant advantages, including: (1) providing a means for reducing weight in assemblies that incorporate bearing liners; (2) providing a means for reducing weight in machines that are weight sensitive that incorporate bearing liners; and (3) providing a lighter-weight bearing liner.

Further objects and advantages of this invention will become apparent from a consideration of the drawings and ensuing description.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
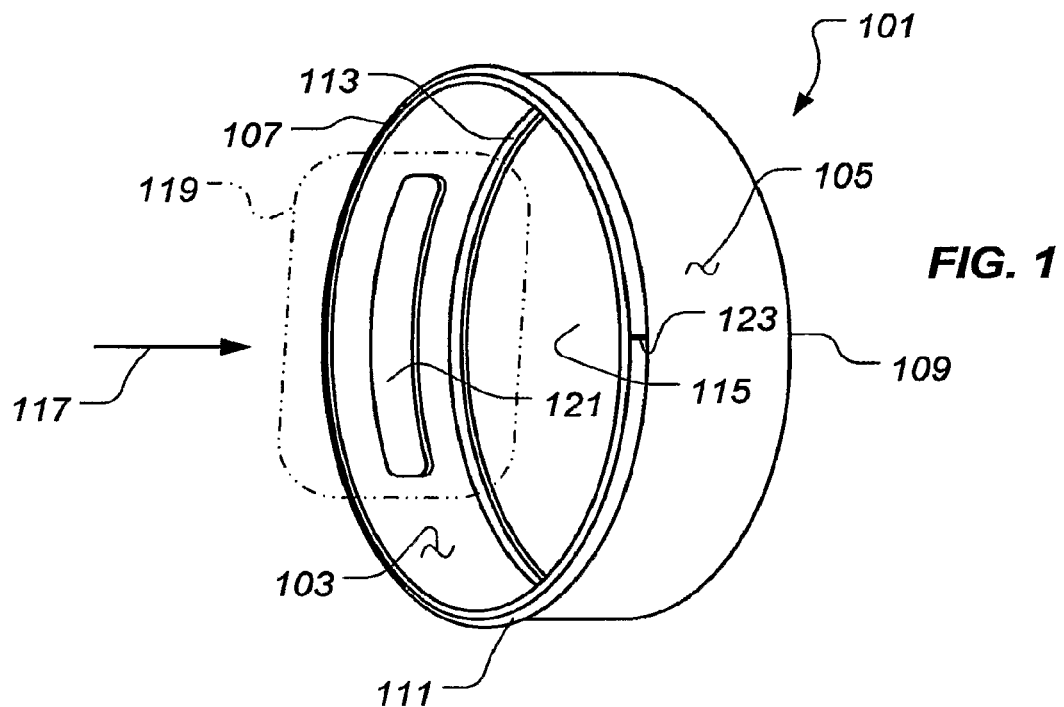
FIG. 1 is a stylized, perspective view of a first illustrative embodiment of a bearing liner according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents sculptured bearing liner and a bearing assembly incorporating the sculptured bearing liner. The bearing liner includes a loaded portion and an unloaded or lightly loaded portion. The loaded portion and the unloaded or lightly loaded portion is determined by a load direction analysis. The unloaded or lightly loaded portion defines one or more recesses or openings that decrease the overall weight of the bearing liner. Because the one or more recesses or openings are defined in the unloaded or lightly loaded portion of the bearing liner, the overall suitability or strength of the bearing liner, and thus the bearing assembly incorporating the bearing liner, is not adversely impacted.

FIG. 1 depicts a first illustrative embodiment of a sculptured bearing liner 101 according to the present invention. Bearing liner 101 comprises an inner surface 103 and an outer surface 105, each extending between a first edge 107 and a second edge 109. In the illustrated embodiment, an outer lip 111 extends radially outwardly from outer surface 105 at first edge 107 and an inner lip 113 extends radially inwardly from inner surface 103 at second edge 109. It should be noted, however, that the present invention contemplates embodiments wherein one or both of outer lip 111 and inner lip 113 are omitted. Inner surface 103 and inner lip 113, if present, define a cavity 115 in which one or more bearings, such as one or more of bearings 301, 303, and 305 (not shown in FIG. 1 but shown in FIGS. 3 and 4) are received. Inner lip 113, if present, retains the one or more bearings in cavity 115, as the one or more bearings cannot move beyond inner lip 113 in a direction generally corresponding to an arrow 117.

Generally, mechanical loads are transmitted through the one or more bearings, such as bearings 301, 303, and 305, to bearing liner 101 when the one or more bearings and bearing liner 101 are in service. In some implementations, however, loads are applied only to a portion of bearing liner 101. Thus, bearing liner 101 includes a low-load zone 119, indicated in FIG. 1 as the portion within the phantom line. It should be noted that, for the purposes of this disclosure, loads ranging from substantially no loads to mechanically insignificant loads are imparted to low-load zone 119.

Bearing liner 101, therefore, defines a reduced thickness area 121 in low-load zone 119, as low-load zone 119 does not require the mechanical properties required by other zone or zones of bearing line 101 require. Preferably, low-load zone 119 is 180° out of phase from a loaded zone of bearing liner 101. In one particular preferred embodiment, reduced thickness area 121 is formed by a recess extending from inner surface 103 but not extending to outer surface 105. It should be noted, however, that the present invention contemplates an embodiment wherein reduced thickness area 121 is formed by a recess extending from outer surface 103 but not extending to inner surface 105. In another particular preferred embodiment, reduced thickness area 121 is formed by an opening extending from inner surface 103 to outer surface 105 but not extending to either first edge 107 or second edge 109. It should be noted that one or more portions of reduced thickness area 121 may fully extend between inner surface 103 and outer surface 105, while one or more other portions of reduced thickness area 121 may extend from inner surface 103 but not to outer surface 105 or may extend from outer surface 105 but not extend to inner surface 103.

While reduced thickness area 121 is depicted in FIG. 1 as having a particular size and shape, the scope of the present invention is not so limited. Rather, the scope of the present invention encompasses any bearing liner, such as bearing liner 101, having a reduced thickness area, such as reduced thickness area 121, of any suitable size and shape. The reduced thickness area, however, is confined within a low-load zone, such as low-load zone 119, of the bearing liner.

Bearing liner 101 further comprises one or more clocking features 123 to aid in proper alignment of bearing liner 101 with respect to elements or components transmitting mechanical loads thereto. In the illustrated embodiment, clocking feature 123 is a mark that is substantially aligned with a corresponding mark on a structure in which bearing liner 101 is received. The present invention, however, contemplates clocking features other than a mark.

Figure 2:
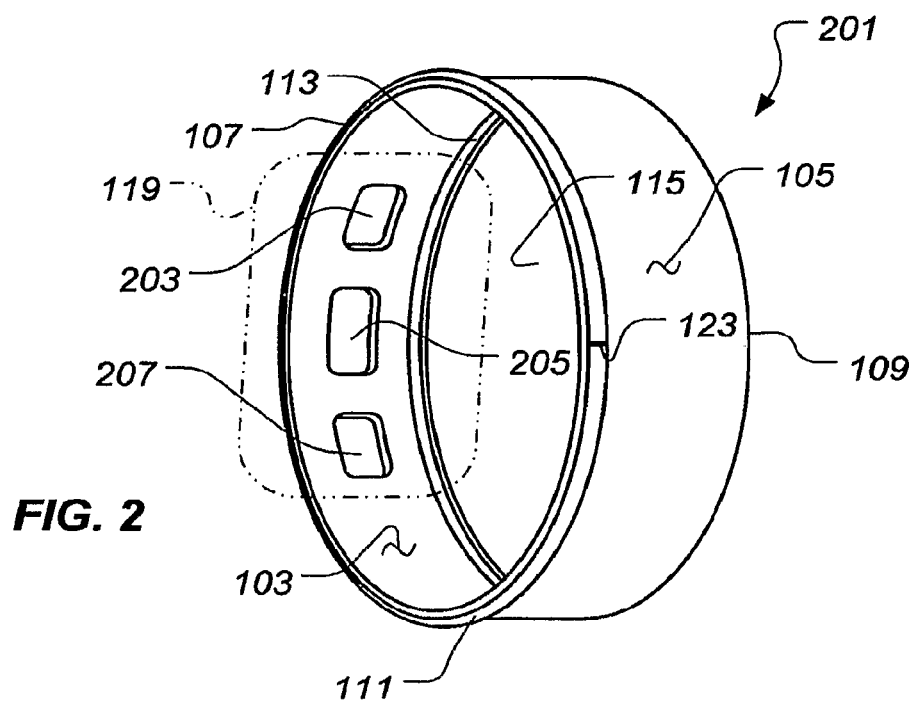
FIG. 2 is a stylized, perspective view of a second illustrative embodiment of a bearing liner according to the present invention.

FIG. 2 depicts a second illustrative embodiment of a sculptured bearing liner 201 according to the present invention. Elements and features of bearing liner 201 correspond to elements and features of bearing liner 101, except that reduced thickness area 121 is replaced by a plurality of reduced thickness areas 203, 205, and 207. One or more of reduced thickness areas 203, 205, and 207, in a preferred embodiment, extend from inner surface 103 but do not extend to outer surface 105. In another preferred embodiment, one or more of reduced thickness areas 203, 205, and 207 extend from inner surface 103 to outer surface 105. The present invention, however, contemplates embodiments wherein one or more of reduced thickness areas 203, 205, and 207 extend from outer surface 103 but do not extend to inner surface 103. It should be noted that one or more portions of reduced thickness areas 203, 205, or 207 may fully extend between inner surface 103 and outer surface 105, while one or more other portions of reduced thickness areas 203, 205, or 207 may extend from inner surface 103 but not to outer surface 105 or may extend from outer surface 105 but not extend to inner surface 103.

While reduced thickness areas 203, 205, and 207 are depicted in FIG. 2 as having particular sizes and shapes, the scope of the present invention is not so limited. Rather, the scope of the present invention encompasses any bearing liner, such as bearing liner 101, having a plurality of reduced thickness areas, such as reduced thickness areas 203, 205, and 207, of any suitable size and shape. The reduced thickness areas, however, are confined within a low-load zone, such as low-load zone 119, of the bearing liner.

Figure 3:
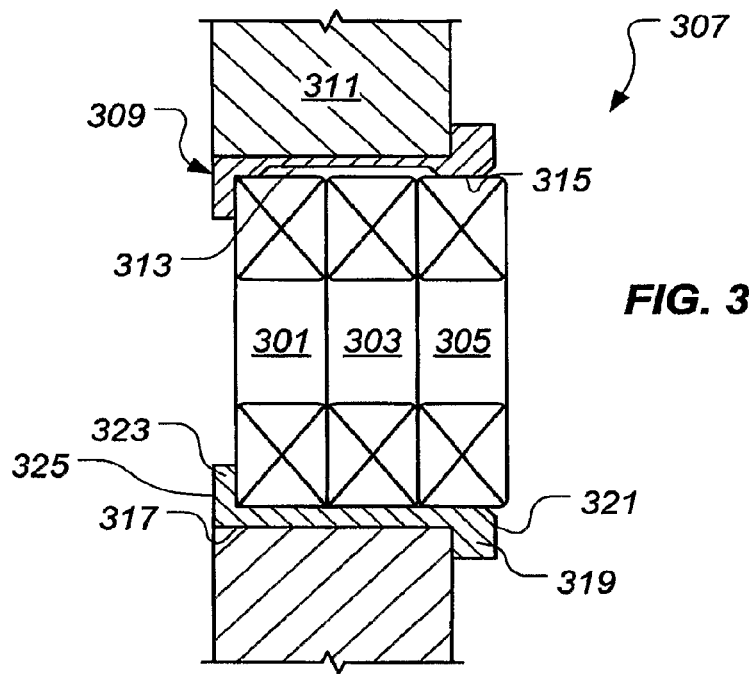
FIG. 3 is a stylized, cross-sectional view of a first illustrative embodiment of a bearing assembly including a plurality of bearings mounted in the bearing liner of FIG. 1, according to the present invention.
Figure 4:
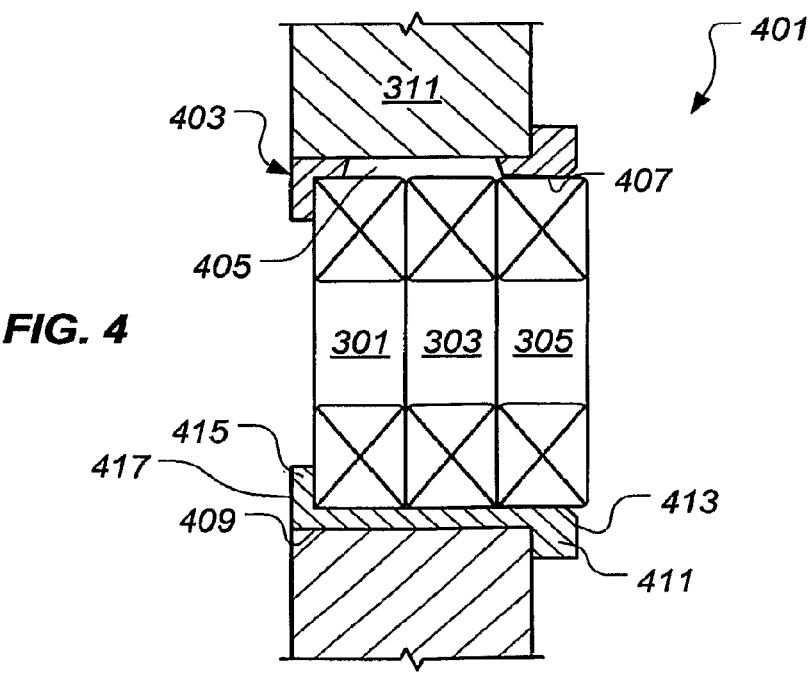
FIG. 4 is a stylized, cross-sectional view of a second illustrative embodiment of a bearing assembly including a plurality of bearings mounted in the bearing liner of FIG. 2, according to the present invention.

FIGS. 3 and 4 depict illustrative embodiments of bearing assemblies 307 and 401, respectively. Referring in particular to FIG. 3, bearing assembly 307 comprises one or more bearings 301, 303, and 305 received in a sculptured bearing liner 309. Bearing liner 309 is retained in a structure 311, preferably via a press fit. It should be noted that bearing assembly 307 may comprise other components or elements. In the illustrated embodiment, bearing liner 309 defines a reduced thickness area, indicated generally at 313. Bearing liner 309 may define a single reduced thickness area 313, corresponding to the embodiment of FIG. 1, or may define a plurality of reduced thickness areas 313, corresponding to the embodiment of FIG. 2. In the illustrated embodiment, reduced thickness area 313 extends from an inner surface 315 of bearing liner 309 but does not extend to an outer surface 317 of bearing liner 309. As discussed in reference to the embodiments of FIGS. 1 and 2, reduced thickness area 313 may, in an alternative embodiment, extend from outer surface 317 but not extend to inner surface 317. In the illustrated embodiment, an outer lip 319 extends radially outwardly from outer surface 317 at a first edge 321 of bearing liner 309 and an inner lip 323 extends radially inwardly from inner surface 315 at a second edge 325 of bearing liner 309. It should be noted, however, that the present invention contemplates embodiments wherein one or both of outer lip 319 and inner lip 323 are omitted.

Turning now to FIG. 4, bearing assembly 401 comprises one or more bearings 301, 303, and 305 received in sculptured bearing liner 403. Bearing liner 403 is retained in structure 311, preferably by a press fit. Note that bearing assembly 401 may comprise other components or elements. In the illustrated embodiment, bearing liner 309 defines an opening 405 extending between an inner surface 407 and an outer surface 409 of bearing liner 403. Opening 405 forms a reduced thickness area, i.e., a zero-thickness area, in bearing liner 403. In the illustrated embodiment, an outer lip 411 extends radially outwardly from outer surface 409 at a first edge 413 of bearing liner 403 and an inner lip 415 extends radially inwardly from inner surface 407 at a second edge 417 of bearing liner 403. It should be noted, however, that the present invention contemplates embodiments wherein one or both of outer lip 411 and inner lip 407 are omitted.

It should be noted that the bearing liner of the present invention, such as bearing liner 101, 201, 309, and 403, is a non-rotating element. In other words, bearing liners 101, 201, 309, and 403 do not rotate with respect to a structure, such as structure 311 (shown in FIG. 3), or with respect to a bearing, such as bearings 301, 303, or 305 (shown in FIGS. 3 and 4). Preferably, bearing liners 101, 201, 309, and 403, or their equivalents, comprise steel or a ceramic material. It should be noted that, in some embodiments, a portion of outer lip 111, 319, or 411 and/or a portion of inner lip 113, 315, or 407 may be removed, for example, to facilitate removal of bearing liners 101, 201, 309, and 403 from a structure, to facilitate removal of a bearing from bearing liners 101, 201, 309, and 403, and/or to provide clearance for one or more other elements or components. It should also be noted that the bearing liner of the present invention, such as bearing liner 101, 201, 309, and 403, can take on any suitable size or shape.

The present invention has particular utility in machinery that is weight sensitive, such as helicopters, airplanes, aircraft, vehicles, and the like. Implementation of the bearing liner of the present invention can produce a weight savings, in one embodiment, of up to about 40% as compared to conventional bearing liners.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A sculptured bearing liner for reception within a structure, the sculptured bearing liner comprising:
    an inner surface defining a cavity configured to receive a plurality of bearings;
    an outer surface configured to receive the structure, the inner surface and the outer surface extending between a first edge and a second edge;
    a reduced thickness portion extending from one of the inner surface and the outer surface, the reduced thickness portion confined within a low-load zone, the reduced thickness portion is configured to avoid contact with the first edge and the second edge; and
    a clocking feature configured to align with a corresponding feature on the structure, the clocking feature orienting the bearing liner such that the reduced thickness portion is aligned within the low-load zone;
    wherein the bearing liner has a rigid uniformed cylindrical shape.

2. The sculptured bearing liner, according to claim 1, wherein the reduced thickness portion exhibits a thickness of zero.

3. The sculptured bearing liner, according to claim 1, wherein the reduced thickness portion defines an opening therethrough.

4. The sculptured bearing liner, according to claim 1, further comprising:
    at least one additional reduced thickness portion.

5. The sculptured bearing liner, according to claim 4, wherein the at least one additional reduced thickness portion exhibits a thickness of zero.

6. The sculptured bearing liner, according to claim 4, wherein the at least one additional reduced thickness portion defines a corresponding at least one opening therethrough.

7. The sculptured bearing liner, according to claim 1, wherein the reduced thickness portion extends about a partial circumference of the sculptured bearing liner.

8. The sculptured bearing liner, according to claim 1, wherein the first edge defines a lip.

9. The sculptured bearing liner, according to claim 1, wherein the clocking feature is a mark located on the edge of the at least one of the outer surface and the inner surface.

10. A bearing assembly, comprising:
    a bearing liner having an inner surface and an outer surface extending between a first edge and a second edge, the first edge being opposite the second edge, the inner surface defining a cavity to receive a plurality of bearings;
    a low-load zone located within the bearing liner, the low-load zone being out of phase from a loaded zone on the bearing liner;
    a reduced thickness portion in at least one of the inner surface and the outer surface, the reduced thickness portion being confined within the low-load zone and configured to avoid contact with the first edge and the second edge; and
    a plurality of bearings disposed in the cavity.

11. The bearing assembly, according to claim 10, wherein the reduced thickness portion exhibits a thickness of zero.

12. The bearing assembly, according to claim 10, wherein the reduced thickness portion defines an opening therethrough.

13. The bearing assembly, according to claim 10, wherein the bearing liner further comprises:
    at least one additional reduced thickness portion.

14. The bearing assembly, according to claim 13, wherein the at least one additional reduced thickness portion exhibits a thickness of zero.

15. The bearing assembly, according to claim 13, wherein the at least one additional reduced thickness portion defines a corresponding at least one opening therethrough.

16. The bearing assembly, according to claim 10, wherein the reduced thickness portion extends about a partial circumference of the bearing liner.

17. The bearing assembly, according to claim 10, wherein the first edge defines a lip.

18. The bearing assembly, according to claim 10, wherein the bearing liner further comprises:
    a clocking feature configured to locate the reduced thickness portion in the low-load zone.

* * * * *